(12) United States Patent
Hosoya et al.

(10) Patent No.: US 10,373,638 B2
(45) Date of Patent: Aug. 6, 2019

(54) HEXAGONAL FERRITE POWDER AND MAGNETIC RECORDING MEDIUM

(71) Applicant: FUJIFILM Corporation, Tokyo (JP)

(72) Inventors: Yoichi Hosoya, Minami-ashigara (JP); Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 298 days.

(21) Appl. No.: 15/475,615

(22) Filed: Mar. 31, 2017

(65) Prior Publication Data

US 2017/0287517 A1    Oct. 5, 2017

(30) Foreign Application Priority Data

Mar. 31, 2016 (JP) .................................. 2016-073394

(51) Int. Cl.
| | | |
|---|---|---|
| G11B 5/70 | (2006.01) | |
| G11B 5/706 | (2006.01) | |
| G11B 5/714 | (2006.01) | |
| G11B 5/78 | (2006.01) | |
| H01F 1/11 | (2006.01) | |
| B82Y 25/00 | (2011.01) | |
| H01F 1/00 | (2006.01) | |

(52) U.S. Cl.
CPC ...... *G11B 5/70615* (2013.01); *G11B 5/70678* (2013.01); *G11B 5/714* (2013.01); *G11B 5/78* (2013.01); *H01F 1/11* (2013.01); *B82Y 25/00* (2013.01); *H01F 1/0063* (2013.01)

(58) Field of Classification Search
None
See application file for complete search history.

(56) References Cited

U.S. PATENT DOCUMENTS

| | | | | |
|---|---|---|---|---|
| 6,770,359 | B2 * | 8/2004 | Masaki | .................... G11B 5/70 |
| | | | | 428/336 |
| 9,601,146 | B2 * | 3/2017 | Kasada | .................... G11B 5/78 |
| 2015/0279408 | A1 | 10/2015 | Hosoya | |
| 2016/0372145 | A1 | 12/2016 | Maeshima | |

FOREIGN PATENT DOCUMENTS

| | | |
|---|---|---|
| JP | 2015-201246 A | 11/2015 |
| WO | 2015/025465 A1 | 2/2015 |

OTHER PUBLICATIONS

Communication issued on Dec. 11, 2018 by the Japanese Patent Office in counterpart JP application No. 2016-073394.

* cited by examiner

*Primary Examiner* — Kevin M Bernatz
(74) *Attorney, Agent, or Firm* — Sughrue Mion, PLLC

(57) ABSTRACT

Hexagonal ferrite powder has an average particle size falling within a range of 10 nm to 50 nm, a switching field distribution $SFD_{23°\ C.}$ measured at a temperature of 23° C. that is less than or equal to 0.80, and a ratio of a switching field distribution $SFD_{-190°\ C.}$ that is measured at a temperature of $-190°$ C. to the $SFD_{23°\ C.}$ ($SFD_{-190°\ C.}/SFD_{23°\ C.}$) that is greater than 0.80.

9 Claims, 5 Drawing Sheets

HEXAGONAL FERRITE POWDER AND MAGNETIC RECORDING MEDIUM

CROSS-REFERENCE TO RELATED APPLICATIONS

This application claims priority under 35 U.S.C 119 to Japanese Patent Application No. 2016-073394 filed on Mar. 31, 2016. The above application is hereby expressly incorporated by reference, in its entirety.

BACKGROUND OF THE INVENTION

Field of the Invention

The present invention relates to hexagonal ferrite powder and a magnetic recording medium.

Discussion of the Background

Higher density recording is constantly being demanded in the magnetic recording field due to the increase in the amount of information being recorded. Reducing the particle size in the ferromagnetic powder used in the magnetic layer and increasing the fill rate of the magnetic layer have been examined to achieve higher density recording (for example, see WO 2015/025465A1 or English language family member US2016/372145A1, which are expressly incorporated herein by reference, in their entirety). In this regard, hexagonal ferrite powder is said to be suitable for achieving higher density recording by a reduction in particle size (referred to as "particle size reduction" hereinafter) among the various types of ferromagnetic powders.

SUMMARY OF THE INVENTION

The achievement of good electromagnetic characteristics is being demanded of magnetic recording media in addition to higher density recording. Specifically, electromagnetic characteristics are evaluated based on the signal-to-noise ratio (SNR), which is the ratio of the reproduction output to noise. Particle size reduction of the hexagonal ferrite powder contained in the magnetic layer of a magnetic recording medium is advantageous to reducing noise. However, the smaller the particles of hexagonal ferrite powder become, even assuming a reduction in noise can be achieved, the greater the tendency for electromagnetic characteristics to deteriorate due to a drop in output. This tendency becomes even more pronounced when reproducing a signal that has been recorded at high density.

An aspect of the present invention provides for a magnetic recording medium containing hexagonal ferrite powder of reduced particle size that can afford good electromagnetic characteristics.

An aspect of the present invention relates to hexagonal ferrite powder having:

an average particle size falling within a range of 10 nm to 50 nm;

a switching field distribution $SFD_{23°\ C.}$ measured at a temperature of 23° C. that is less than or equal to 0.80; and a ratio of a switching field distribution $SFD_{-190°\ C.}$ that is measured at a temperature of −190° C. to the $SFD_{23°\ C.}$ ($SFD_{-190°\ C.}/SFD_{23°\ C.}$) that is greater than 0.80.

SFD is an abbreviation for switching field distribution.

The above hexagonal ferrite powder is hexagonal ferrite powder having an average particle size that has been reduced to 10 nm to 50 nm. Extensive research by the present inventors has revealed that a magnetic recording medium having a magnetic layer containing hexagonal ferrite powder the particle size of which has been reduced in this manner can afford good electromagnetic characteristics. In this regard, the present inventors presume the reason it is possible to provide a magnetic recording medium affording good electromagnetic characteristics by using the above hexagonal ferrite powder as the ferromagnetic powder in the magnetic layer, despite the fact that it has a reduced particle size, to be because the above hexagonal ferrite powder has magnetic characteristics that differ from those of conventional hexagonal ferrite powder, that is, an $SFD_{23°\ C.}$ falling within the above range and a ratio ($SFD_{-190°\ C.}/SFD_{23°\ C.}$) falling within the above range. The magnetic characteristics of the above hexagonal ferrite powder will be described in detail further below.

In the present invention and present specification, the average particle size of ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder, such as ferromagnetic powder and various kinds of powder is the average particle size as obtained by the above method. The average particle size indicated in Examples further below was obtained using a Model H-9000 transmission electron microscope made by Hitachi and KS-400 image analysis software made by Carl Zeiss. In the present invention and present specification, the term "powder" means a collection of multiple particles. For example, ferromagnetic powder means a collection of multiple ferromagnetic particles. The term "collection" is not limited to forms in which the constituent particles are in direct contact, but also includes forms in which binder, additives, or the like are present between the particles. Powder and particles of hexagonal ferrite will sometimes be referred to as hexagonal ferrite hereinafter.

In the present invention and present specification, the size of the particles constituting powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

Unless specifically stated otherwise, when the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The switching field distribution SFD can be measured with a known magnetic characteristic measuring device such as a vibrating sample magnetometer. The same applies to the measurement of saturation magnetization and coercive force in the description given below. The temperature during measurement of magnetic characteristics such as the switching field distribution SFD can be adjusted as a setting on the measurement device. Unless specifically stated otherwise, the temperature during measurement of magnetic characteristics is 23° C. The temperature refers to the atmospheric temperature in the measurement environment at the time of measurement.

Measurement of the average particle size and measurement of magnetic characteristics will sometimes be conducted on samples present in the form of powder, and sometimes be conducted on samples obtained using a known method to extract powder that is contained in a magnetic recording medium. For example, the method described in Japanese Unexamined Patent Publication (KOKAI) No. 2015-91747, paragraph 0032, can be employed as the method of extracting hexagonal ferrite powder from the magnetic layer for measurement. The content of the above publication is expressly incorporated herein by reference in its entirety.

In one embodiment, the saturation magnetization of the above hexagonal ferrite powder is greater than or equal to 30.0 A·m²/kg.

In one embodiment, the coercive force of the above hexagonal ferrite powder is greater than or equal to 159 kA/m.

In one embodiment, the average particle size of the above hexagonal ferrite powder falls within a range of 10 nm to 35 nm.

In one embodiment, the $SFD_{23° C.}$ of the above hexagonal ferrite powder is less than or equal to 0.60.

In one embodiment, the $SFD_{23° C.}$ of the above hexagonal ferrite powder falls within a range of 0.10 to 0.60.

In one embodiment, the ratio ($SFD_{-190° C.}/SFD_{23° C.}$) of the above hexagonal ferrite powder is greater than or equal to 0.90.

In one embodiment, the ratio ($SFD_{-190° C.}/SFD_{23° C.}$) of the above hexagonal ferrite powder falls within a range of 0.90 to 1.50.

A further aspect of the present invention relates to a magnetic recording medium having a magnetic layer containing ferromagnetic powder and binder on a nonmagnetic support in which the ferromagnetic powder is the above hexagonal ferrite powder according to an aspect of the present invention.

An aspect of the present invention can provide hexagonal ferrite powder with an average particle size falling within a range of 10 nm to 50 nm that permits the fabrication of a magnetic recording medium affording good electromagnetic characteristics, and a magnetic recording medium containing this hexagonal ferrite powder.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
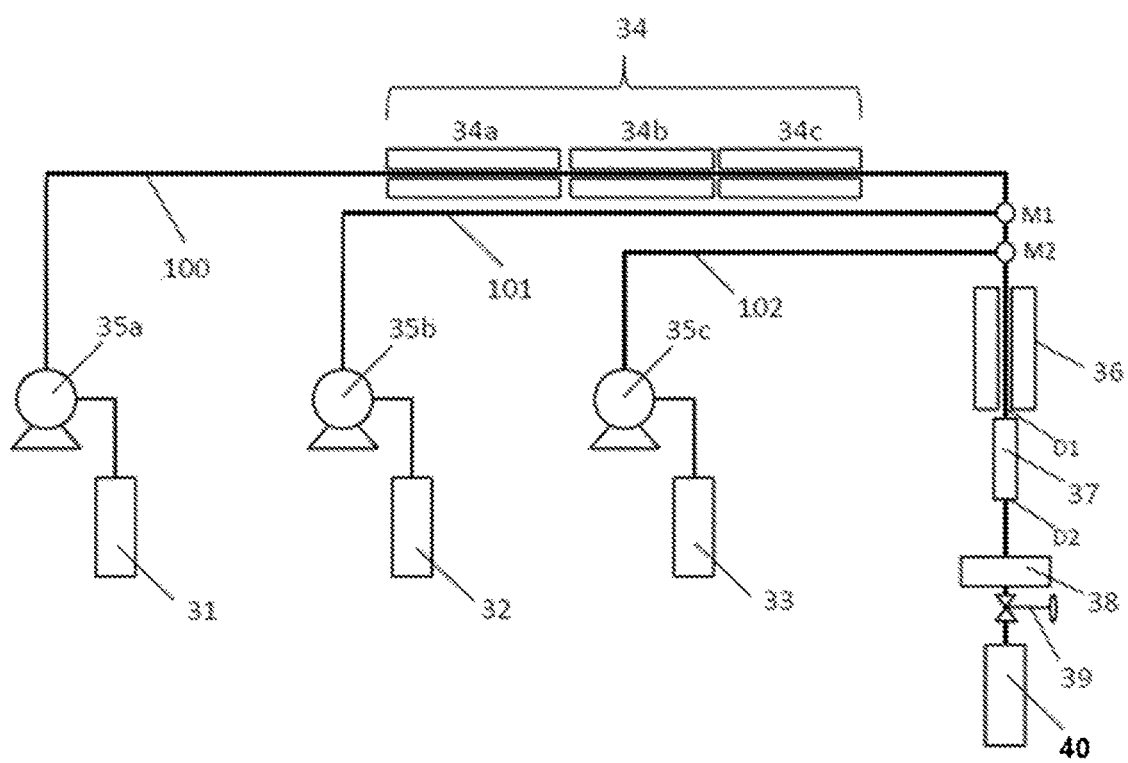
FIG. 1 is a schematic descriptive drawing of an example of a manufacturing device that can be employed to manufacture hexagonal ferrite powder employed in the continuous hydrothermal synthesis method.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Hexagonal Ferrite Powder

An aspect of the present invention relates to hexagonal ferrite powder having an average particle size falling within a range of 10 nm to 50 nm; a switching field distribution $SFD_{23°\ C.}$ measured at a temperature of 23° C. that is less than or equal to 0.80; and a ratio of a switching field distribution $SFD_{-190°\ C.}$ that is measured at a temperature of −190° C. to the $SFD_{23°\ C.}$ ($SFD_{-190°\ C.}/SFD_{23°\ C.}$) that is greater than 0.80.

The above hexagonal ferrite powder will be described in greater detail below.

<Average Particle Size>

The average particle size of the above hexagonal ferrite powder falls within a range of 10 nm to 50 nm. Having an average particle size falling within this range can contribute to enhancing the electromagnetic characteristics of a magnetic recording medium having a magnetic layer containing the above ferromagnetic powder. From the perspective of further enhancing the electromagnetic characteristics, the average particle size of the above hexagonal ferrite powder is desirably greater than or equal to 12 nm, preferably greater than or equal to 15 nm. From the same perspective, the average particle size of the above hexagonal ferrite powder is desirably less than or equal to 40 nm, preferably less than or equal to 35 nm, and more preferably, less than or equal to 30 nm. The use of hexagonal ferromagnetic powder with an average particle size falling within this range as ferromagnetic powder in the magnetic layer is desirable also from the perspective of achieving a higher recording density in the magnetic recording medium.

<$SFD_{23°\ C.}$, Ratio ($SFD_{-190°\ C.}/SFD_{23°\ C.}$)>

The above hexagonal ferrite powder has a switching field distribution $SFD_{23°\ C.}$ measured at a temperature of 23° C. of less than or equal to 0.80 and a ratio ($SFD_{-190°\ C.}/SFD_{23°\ C.}$) that is greater than 0.80. These magnetic characteristics differ greatly from the magnetic characteristics of conventional hexagonal ferrite powder the particle size of which has been reduced, such as described in the above WO 2015/025465A1. The present inventors presume this to be why a magnetic recording medium having a magnetic layer containing the above hexagonal ferrite powder can exhibit good electromagnetic characteristics.

The $SFD_{23°\ C.}$ of the above hexagonal ferrite powder is less than or equal to 0.80. From the perspective of further enhancing the electromagnetic characteristics of a magnetic recording medium having a magnetic layer containing this hexagonal ferrite powder, less than or equal to 0.70 is desirable, less than or equal to 0.60 is preferable, less than or equal to 0.50 is more preferable, less than or equal to 0.40 is still more preferably, and less than or equal to 0.30 is even more preferable. The $SFD_{23°\ C.}$ can be, for example, greater than or equal to 0.10, or greater than or equal to 0.15. However, since the lower the value, the better the electromagnetic characteristics, the $SFD_{23°\ C.}$ is not limited to these lower limits, which are given by way of example.

The ratio ($SFD_{-190°\ C.}/SFD_{23°\ C.}$) is greater than 0.80. From the perspective of further enhancing the electromagnetic characteristics of a magnetic recording medium having a magnetic layer containing this hexagonal ferrite powder, greater than or equal to 0.85 is desirable, greater than or equal to 0.90 is preferable, greater than or equal to 1.00 is more preferable, and greater than or equal to 1.10 is even more preferable. The ratio ($SFD_{-190°\ C.}/SFD_{23°\ C.}$) can be, for example, less than or equal to 1.50 or less than or equal to 1.45. However, it is not limited to these upper limits, which are given by way of example.

The switching field distribution $SFD_{-190°\ C.}$ that is measured at a temperature of −190° C. falls, for example, within a range of 0.20 to 0.80. However, since it suffices for the ratio of the $SFD_{-190°\ C.}$ to the $SFD_{23°\ C.}$ ($SFD_{-190°\ C.}/SFD_{23°\ C.}$) to be greater than 0.80, it can fall outside the range that has been given above by way of example.

<Other Magnetic Characteristics>

From the perspective of permitting the fabrication of magnetic recording media capable of affording even better magnetic characteristics, the above hexagonal ferrite powder desirably has one or more of the following magnetic characteristics. However, it suffices for the above hexagonal ferrite powder to have an average particle size and magnetic characteristics ($SFD_{23°\ C.}$ and ratio ($SFD_{-190°\ C.}/SFD_{23°\ C.}$)) falling within the ranges set forth above. The other magnetic characteristics are not limitations.

The saturation magnetization is desirably greater than or equal to 30.0 A·m²/kg, preferably greater than or equal to 35.0 A·m²/kg, and more preferably, greater than or equal to 40.0 A·m²/kg. By way of example, the saturation magnetization can be less than or equal to 60.0 m²/kg, or less than or equal to 50.0 m²/kg. However, it is not limited by these upper limits, which are given by way of example.

The coercive force is desirably greater than or equal to 159 kA/m (2,000 Oe), preferably greater than or equal to 167 kA/m (2,100 Oe), and more preferably, greater than or equal to 175 kA/m (2,200 Oe). By way of example, the coercive force can be less than or equal to 207 kA/m (2,600 Oe), or less than or equal to 199 kA/m (2,500 Oe). However, it is not limited to these upper limits, which are given by way of example.

The above coercive force is measured at a temperature of 23° C. In the above hexagonal ferrite, the ratio ($Hc_{-190°\ C.}/Hc_{23°\ C.}$) of the coercive force $Hc_{-190°\ C.}$ measured at a temperature of −190° C. to the coercive force $Hc_{23°\ C.}$ measured at a temperature of 23° C. is desirably less than 1.20, preferably less than or equal to 1.10, and more preferably, less than or equal to 1.05. The ratio ($Hc_{-190°\ C.}/Hc_{23°\ C.}$) can be, for example, greater than or equal to 0.80, or greater than or equal to 0.90. However, it is not limited by these upper limits, which are given by way of example.

The crystalline structure of hexagonal ferrite is known to come in magnetoplumbite ("M"), W, Y, and Z types. The above hexagonal ferrite powder can be of any crystalline structure.

<Method of Manufacturing Hexagonal Ferrite Powder>

The coprecipitation method, reverse micelle method, hydrothermal synthesis method, glass crystallization method, and the like are known as methods of manufacturing hexagonal ferrite. From the perspective of the ease of manufacturing hexagonal ferrite powder having an average particle size and magnetic characteristics falling within the above ranges, the above hexagonal ferrite powder is desirably manufactured by the hydrothermal synthesis method, and preferably manufactured by the continuous hydrothermal synthesis method. In the continuous hydrothermal synthesis method, the various manufacturing conditions are desirably controlled to permit manufacturing of the above ferromagnetic hexagonal ferrite powder, which was difficult to obtain by conventional methods of manufacturing hexagonal ferrite powder.

The hydrothermal synthesis method is a technique of converting a hexagonal ferrite precursor into hexagonal ferrite powder by heating an water-based solution containing the hexagonal ferrite precursor. In this process, from the perspective of readily obtaining hexagonal ferrite powder of small average particle size, a continuous hydrothermal method is desirable in which a water based fluid containing the hexagonal ferrite precursor (also referred to simply as "precursor" hereinafter) is heated and pressurized while being fed along a reaction flow path, and the high reactivity of water that is being heated and pressurized (also referred to as "high-pressure, high-temperature water" hereinafter), desirably water in a subcritical to supercritical state, is utilized to convert the hexagonal precursor into hexagonal ferrite. A manufacturing method employing a suitably continuous hydrothermal synthesis method will be described as the method of manufacturing the above hexagonal ferrite powder below. However, it suffices for the hexagonal ferrite powder according to an aspect of the present invention to have an average particle size and magnetic characteristics (SFD$_{23°C.}$ and ratio (SFD$_{-190°C.}$/SFD$_{23°C.}$) falling within the ranges set forth above. The manufacturing method is not limited.

(Preparation of Hexagonal Ferrite Precursor)

The hexagonal ferrite precursor need only be a compound that can convert to hexagonal ferrite (ferrite conversion) when placed in the presence of high-temperature, high-pressure water. The high-temperature, high-pressure water refers to water that is heated and pressurized. The details are given further below. The precursor can exhibit high solubility in water and dissolve in the water-based based solvent described further below, or can have poor solubility in water and can be dispersed (in sol form) as colloidal particles in the water-based solution.

Crystal structures of hexagonal ferrite are set forth above. For example, M-type hexagonal ferrite not containing substitution atoms is a metal oxide denoted by AFe$_{12}$O$_{19}$. A denotes a divalent metal atom. The term "divalent metal atom" refers to a metal atom that is capable of becoming an ion in the form of a divalent cation. This includes alkaline earth metal atoms such as barium, strontium, and calcium, as well as lead and the like. The hexagonal ferrite may contain one or more substitution atoms that are substituted for a portion of the divalent metal atoms. When obtaining such hexagonal ferrite, it suffices to use a salt containing a substituent atom together with a divalent metal salt. Examples of atoms that can be substituted for divalent metal atoms are any of the atoms given further below. However, there is no limitation thereto.

The hexagonal ferrite precursor can be obtained by mixing an iron salt and a divalent metal salt in a water-based solution. This mixing is desirably conducted in a water-based solution containing a base. In the water-based solution, the salt (such as a hydroxide) that is contained with the iron atoms and divalent metal atoms normally precipitates out in the form of particles, desirably colloidal particles. The particles that precipitate out are converted into ferrite and become hexagonal ferrite when subsequently placed in the presence of high-temperature, high-pressure water.

The salt of an alkaline earth metal such as barium, strontium, or calcium, or lead salt can be employed as the divalent metal salt. It suffices to select the type of divalent metal salt based on the hexagonal ferrite that is desired. For example, when barium ferrite is desired, a divalent metal salt in the form of a barium salt is employed. When strontium ferrite is desired, a strontium salt is desired. When mixed crystals of barium ferrite and strontium ferrite are desired, it suffices to employ a combination of divalent metal salts in the form of a barium salt and a strontium salt. For example, hydroxides; halides such as chlorides, bromides, and iodides; nitrates; acetates; and the like can be employed as the salt. Hydrates can also be employed. Water-soluble salts are desirable as salts. From the perspective of ease of manufacturing the hexagonal ferrite powder having the above magnetic characteristics, the more highly water soluble the salt, the more desirable it tends to be.

Water-soluble salts of iron, such as halides such as chlorides, bromides, and iodides; nitrates; sulfates; carbonates; organic acid salts; and complexes can be employed as the iron salt. Hydrates can also be employed.

Based on extensive research conducted by the present inventors, in the mixing ratio of the divalent metal salt and iron salt, it has become clear that increasing the proportion of divalent metal salt relative to the iron salt relative to the desired ferrite composition is desirable to obtain a hexagonal ferrite powder in which the SFD$_{23°C.}$ is less than or equal to 0.8 and the ratio (SFD$_{-190°C.}$/SFD$_{23°C.}$) is greater than 0.80. For this reason, the proportions of divalent metal salt and iron salt are desirably such that when the divalent metal atoms are denoted as A and the molar ratio of divalent metal atoms A to iron atoms Fe is denoted as A/Fe, a ratio of greater than or equal to 1.0 is desirable, greater than or equal to 1.5 is preferred, and greater than or equal to 2.0 is of greater preference. When employing two or more salts of differing divalent metal atoms as the divalent metal salt, A denotes the combined total of the two or more divalent metal atoms. From the perspective of inhibiting precipitation of the divalent metal salt or reducing the amount of precipitation, the ratio of the divalent metal salt and iron salt, denoted as the molar ratio of divalent metal atoms A to iron atoms Fe, A/Fe, is desirably less than or equal to 100.0, preferably less than or equal to 70.0, and more preferably, less than or equal to 50.0.

In addition to the iron salt and divalent metal salt, salts of any atoms capable of constituting hexagonal ferrite in combination with iron atoms and divalent metal atoms can be added. Examples of such optional atoms are Nb, Co, Ti, Zn, and the like. The quantity of the salt of these optional atoms that is added can be determined based on the desired ferrite composition.

A hexagonal ferrite precursor containing the atoms that were contained in these salts will precipitate when the salts set forth above are mixed with a water-based solution desirably containing a base. Primarily hydroxide ions (OH$^-$) in the water-based solution containing a base are thought to form a hydroxide sol with the iron ions contained in the iron salt and divalent metal ions contained in the divalent metal salt, thereby forming the precursor. The precursor that precipitates out here is subsequently converted to hexagonal ferrite (ferrite conversion).

In the present invention and the specification, the base refers to one or more bases as defined by one or more among Arrhenius, Bronsted, or Lewis (Arrhenius bases, Bronsted bases, or Lewis bases).

Specific examples of bases are sodium hydroxide, potassium hydroxide, sodium carbonate, and ammonia water. However, there is no limitation thereto. Nor is there a limitation to inorganic bases; organic bases can also be employed. When the water-based solution for the preparation of the precursor contains the base, some of the salts that are added along with the base will sometimes exhibit acidity. Thus, the pH of the water-based solution is not limited to being alkaline, and will sometimes be neutral or acidic. The pH of the water-based solution is, for example, equal to or higher than 4.00 but equal to or lower than 14.00, as the pH at the solution temperature during preparation of the precursor (during the reaction). From the perspective of getting the reaction to progress smoothly to prepare the precursor, equal to or higher than 5.00 but equal to or lower than 14.00 is desirable, equal to or higher than 6.00 but equal to or lower than 13.00 is preferred, and equal to or higher than 6.00 but equal to or lower than 12.00 is of still greater preference. Having a pH of equal to or higher than 7.00 or exceeding 7.00 (neutral to alkaline) is even more preferable. The temperature of the water-based solution during the reaction can be controlled by heating or cooling, or can be left unregulated at room temperature. The solution temperature desirably falls within a range of 10 to 90° C. The reaction can progress adequately without temperature control (for example, at about 20 to 25° C.). To control the temperature, the reaction tank described further below can be equipped with heating or cooling means. The feed passage described further below can also be heated with a heating means or cooled with a cooling means to regulate the temperature.

The water-based solvent refers to solvent containing water. Water alone will do, as will a mixed solvent of water and an organic solvent. The water-based solvent that is employed to prepare the precursor desirably contains equal to or more than 50 weight percent of water, and is preferably water alone.

An organic solvent that is miscible with water or hydrophilic is desirable as the organic solvent that is combined with water in the water-based solvent. For this reason, a polar solvent is suitably employed. The term "polar solvent" refers to a solvent that either has a dielectric constant of greater than or equal to 15 or a solubility parameter of greater than or equal to 8, or both. Examples of desirable organic solvents, including alcohols, are the organic solvents described in paragraph 0037 of Japanese Unexamined Patent Publication (KOKAI) No. 2015-127986, which is expressly incorporated herein by reference in its entirety.

(Mixing of the Above Components)

Mixing of the above components to prepare the hexagonal ferrite precursor can be conducted in a reaction tank, in one embodiment. A batch-type reaction tank or a continuous-type reaction tank can be employed as the reaction tank. In a batch-type reaction tank, supplying and reacting of the starting materials and removal of the reaction product are conducted in different steps. In a continuous-type reaction tank, supplying and reacting of the starting materials and removal of the reaction produce are conducted in parallel at least part of the time. With both batch-type and continuous-type reaction tanks, stirring and mixing of the water-based solution containing the above components and water-based solvent are normally conducted by a known stirring means, such as stirring vanes or a magnetic stirrer. The various components of the above starting materials can be supplied as solids to the reaction tank, or can be supplied as liquids. The same applies to the supplying of bases. The concentration of the starting materials and bases in the water-based solution can be suitably set. Supplying of the various components into the reaction tank can be conducted simultaneously, or can be sequentially begun in any order. For example, a precipitate containing iron atoms can be obtained by mixing the iron salt and base in a water-based solution, and the precipitate can be mixed with the divalent metal salt in a water-based solution to prepare the precursor.

It is thus possible to obtain a water-based solution containing hexagonal ferrite precursor. The water-based solution containing hexagonal ferrite precursor will also be referred to as a "precursor solution" hereinafter.

In another embodiment, mixing of the above components to prepare a water-based solution containing hexagonal ferrite precursor (precursor solution) can be conducted in a continuous manufacturing process. Desirably, the feed passage over which the water-based solution containing iron salt and divalent metal salt is fed is merged with the feed passage over which the base-containing water-based solution is being fed to mix the solutions and prepare a water-based solution containing hexagonal ferrite precursor.

(Preparation of Hexagonal Ferrite)

Hexagonal ferrite can be prepared by continuously feeding the precursor solution over a reaction flow path that heats and pressurizes the liquid flowing through it to convert the hexagonal ferrite precursor to hexagonal ferrite within the reaction flow path. The present inventors presume that the hexagonal ferrite precursor instantaneously dissolves and then crystallizes within the reaction flow path (within a high-temperature, high-pressure system), causing hexagonal ferrite particles to precipitate (convert to hexagonal ferrite).

In one embodiment, the precursor solution can be continuously fed as is to a reaction flow path that heats and pressurizes the liquid flowing through it. This embodiment will be referred to as embodiment A. In embodiment A, the water that is contained in the precursor solution is heated and pressurized to place the hexagonal ferrite precursor in the presence of high-temperature, high-pressure water and convert the hexagonal ferrite precursor to hexagonal ferrite.

In another embodiment, the precursor solution is merged with a feed passage over which high-temperature, high-pressure water is being fed, and then continuously fed to a reaction flow path that heats and pressurizes the liquid flowing through it to convert the hexagonal ferrite precursor to hexagonal ferrite within the reaction flow path. This embodiment will be referred to as embodiment B.

Embodiment B is desirable in that the hexagonal ferrite precursor is more rapidly placed in a high reaction state by being brought into contact with high-temperature, high-pressure water, rapidly bringing about the conversion to hexagonal ferrite.

From the perspective of the ease of manufacturing hexagonal ferrite powder having an average particle size and magnetic characteristics ($SFD_{23°\ C.}$ and ratio ($SFD_{-190°\ C.}/SFD_{23°\ C.}$) falling within the ranges set forth above, the reaction that converts the hexagonal ferrite precursor to hexagonal ferrite is desirably conducted in the presence of an organic compound in both embodiments A and B. Thus, it is desirable to mix the hexagonal ferrite precursor with the organic compound in some step prior to feeding it to the reaction flow path. The hexagonal ferrite precursor can also be prepared in the presence of an organic compound.

Examples of organic compounds are organic carboxylic acids, organic nitrogen compounds, organic sulfur compounds, organic phosphorus compounds, salts thereof, surfactants, and various polymers. Examples of desirable organic compounds are organic carboxylic acids. An organic carboxylic acid is a compound having one or more carboxyl groups (which can be contained in the form of a salt) per molecule. In salts of carboxyl groups, that is, compounds having a monovalent group denoted as —COOM, M desirably denotes an alkali metal atom such as a sodium atom or potassium atom.

The number of carbon atoms in the organic carboxylic acid is desirably less than or equal to 20, preferably less than or equal to 15, more preferably less than or equal to 10, and even more preferably, falls within a range of 1 to 10. Examples of organic carboxylic acids are aliphatic carboxylic acids, alicyclic carboxylic acids, and aromatic carboxylic acids; aliphatic carboxylic acids are preferred. The aliphatic carboxylic acid can be a saturated or unsaturated carboxylic acid. The organic carboxylic acid can also contain a substituent other than a carboxyl group. Examples are aminocarboxylic acids having an amino group in addition to a carboxyl group, desirably in the form of an organic carboxylic acid. Specific examples of organic carboxylic acids and their salts are octanoic acid, decanoic acid, dodecanoic acid, hexanoic acid, and other monocarboxylic acids and their salts; dodecanedioic acid, decanedioic acid, octanedioic acid, hexanedioic acid, and other dicarboxylic acids and their salts; and 12-aminododecanoic acid, 8-aminooctanoic acid, 10-aminodecanoic acid, 6-aminohexanoic acid, and other aminocarboxylic acids and their salts.

The organic compounds set forth above can be mixed with the precursor solution as an organic compound solution obtained by addition to a solvent, or can be mixed with the hexagonal ferrite precursor by being introduced into a feed passage through which high-temperature, high-pressure water is being fed. The organic compound is desirably mixed in a quantity such that the molar ratio to the iron atoms derived from the iron salt employed to prepare the hexagonal ferrite precursor falls within a range of 0.1 to 50.0, and preferably mixed so that this ratio falls within a range of 1.0 to 20.0. One or more organic compounds can be employed. When employing two or more, this molar ratio is calculated for the combined total of the two or more organic compounds. A solvent in the form of water, or water and an organic solvent that is miscible with water or hydrophilic, is desirable. For this reason, it is suitable to employ a polar solvent as the organic solvent. Examples of desirable organic solvents are the various solvents set forth above. The concentration of the organic compound in the organic compound solution can be set so that a desirable quantity of the organic compound is mixed with the hexagonal ferrite precursor.

When employing an organic compound in embodiment B above, hexagonal ferrite powder is desirably obtained by the following steps:

simultaneously or sequentially introducing the hexagonal ferrite precursor and organic compound into a feed passage into which water is being continuously fed while being heated and pressurized;

over the feed passage, converting hexagonal ferrite precursor to hexagonal ferrite within the reaction flow path by continuously feeding a water-based solution containing at least the hexagonal ferrite precursor, an organic compound, and water to a reaction flow path that heats and pressurizes the fluid that is flowing through it;

discharging the water-based solution containing the hexagonal ferrite from the reaction flow path and feeding to a cooling element; and recovering the hexagonal ferrite from the water-based solution that has been cooled in the cooling element.

In the above steps, examples of specific embodiments of the step of simultaneously or sequentially introducing hexagonal ferrite precursor and an organic compound to a feed passage into which water is being continuously fed while being heated and pressurized include:

an embodiment of sequentially introducing a precursor solution and an organic compound solution to a feed passage to which water is being continuously fed while being heated and pressurized; and an embodiment of mixing a precursor solution and organic compound solution and introducing the mixed solution that has been obtained to a feed passage to which water is being continuously fed while being heated and pressurized.

These embodiments include embodiments in which the step of preparing the hexagonal ferrite precursor is also being conducted in a continuous manufacturing process.

The above embodiments will be further described with reference to the drawings below.

Figure 2:
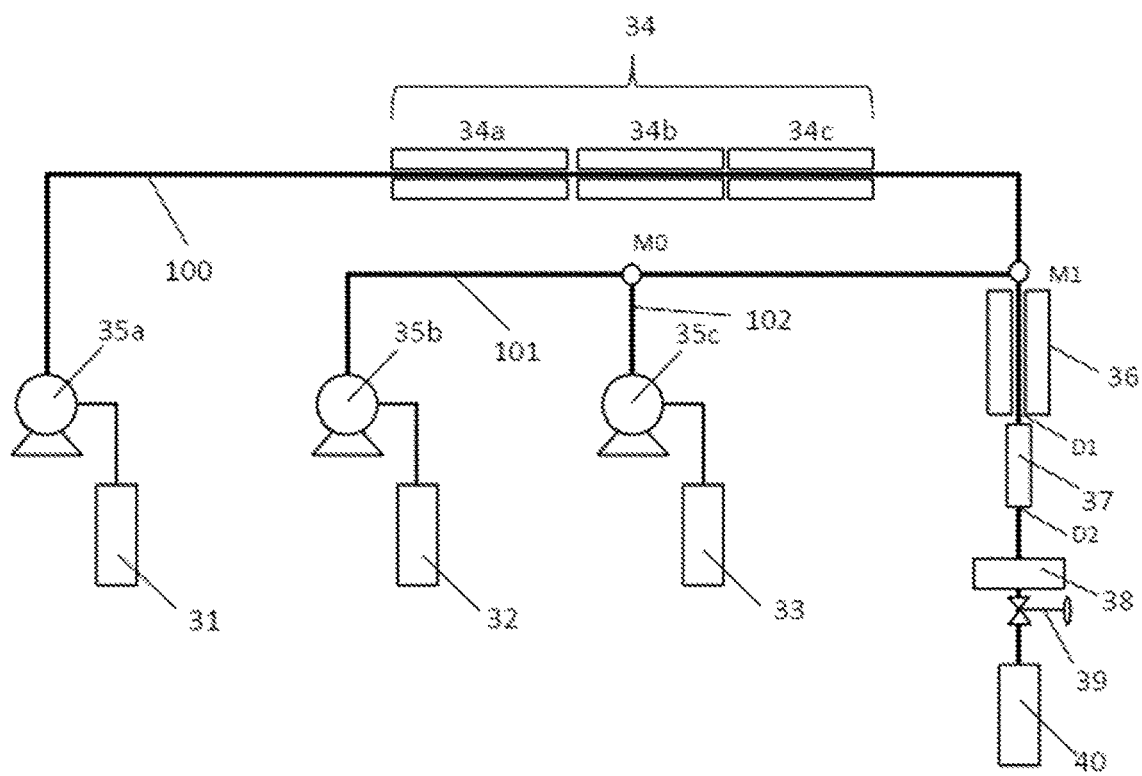
FIG. 2 is a schematic descriptive drawing of an example of a manufacturing device that can be employed to manufacture hexagonal ferrite powder employed in the continuous hydrothermal synthesis method.
Figure 3:
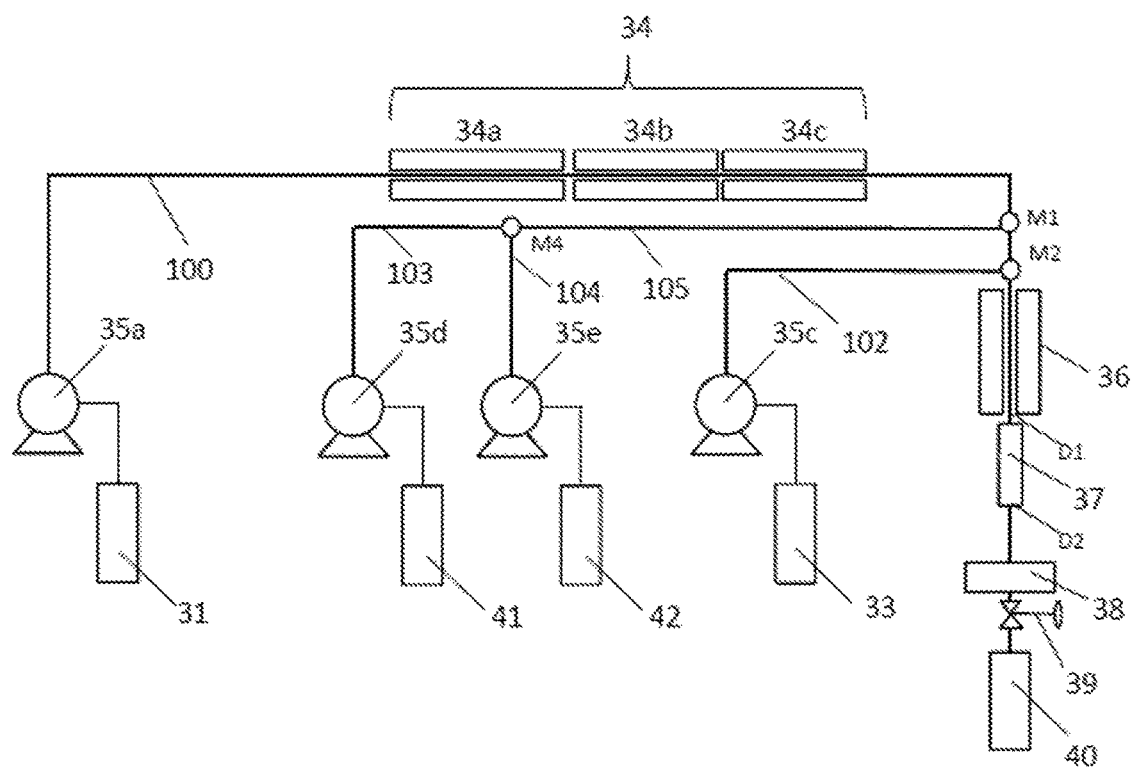
FIG. 3 is a schematic descriptive drawing of an example of a manufacturing device that can be employed to manufacture hexagonal ferrite powder employed in the continuous hydrothermal synthesis method.
Figure 4:
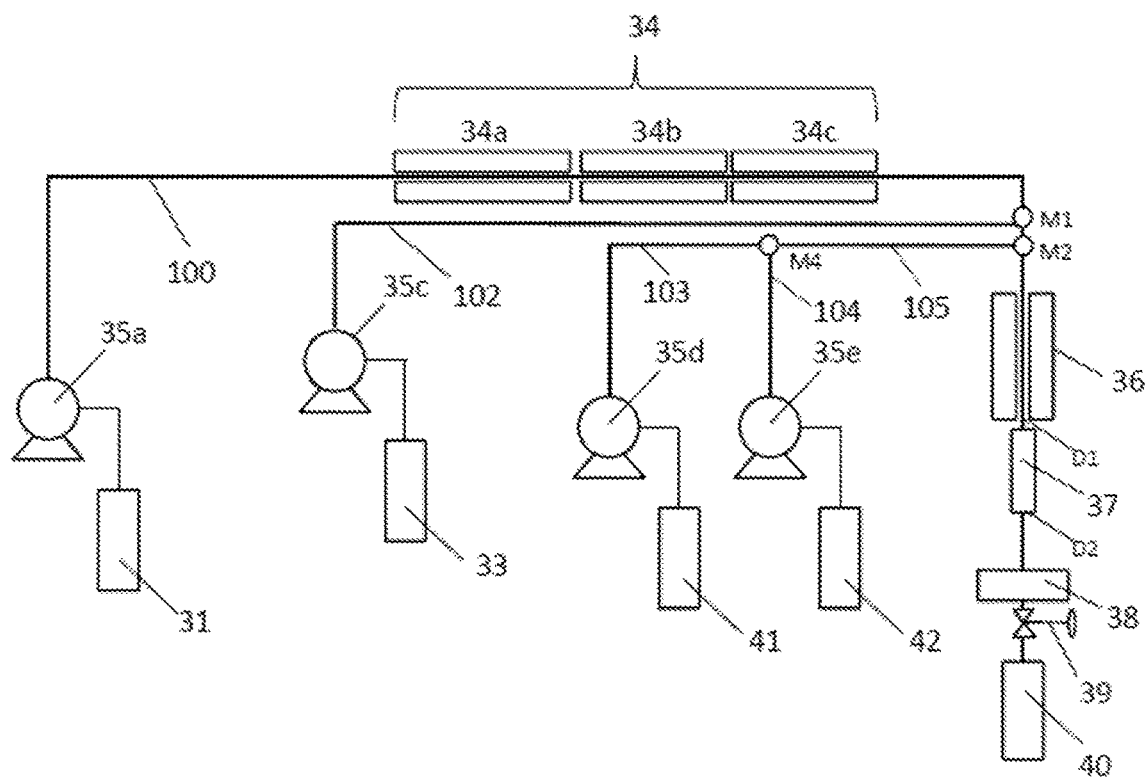
FIG. 4 is a schematic descriptive drawing of an example of a manufacturing device that can be employed to manufacture hexagonal ferrite powder employed in the continuous hydrothermal synthesis method.
Figure 5:
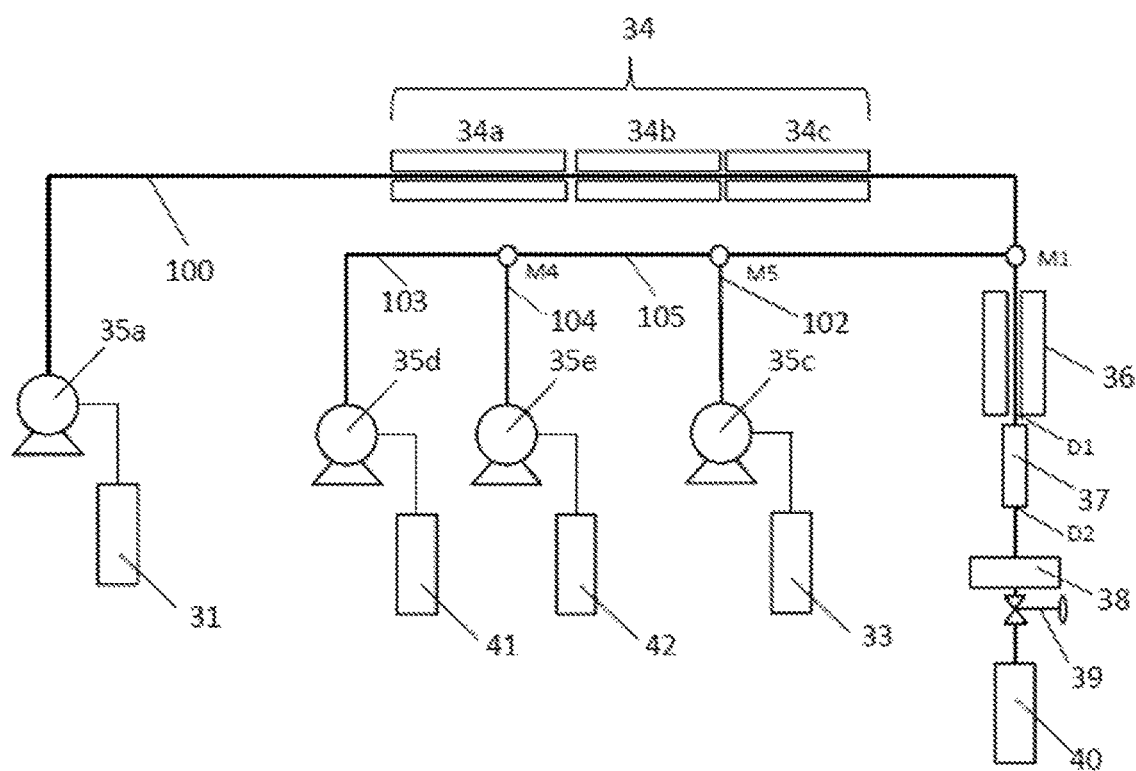
FIG. 5 is a schematic descriptive drawing of an example of a manufacturing device that can be employed to manufacture hexagonal ferrite powder employed in the continuous hydrothermal synthesis method.

FIGS. 1 to 5 are schematic descriptive drawings of manufacturing devices that can be used to manufacture hexagonal ferrite powder by continuously conducting the hydrothermal synthesis method (continuously hydrothermal synthesis method). More particularly, FIGS. 3 to 5 are schematic descriptive drawings of examples of manufacturing devices suited to the embodiment in which the preparation of hexagonal ferrite precursor (precursor solution) is also being conducted in a continuous manufacturing process.

In FIGS. 1 to 5, identical constituent elements have been denoted with identical numbers.

By way of example, FIG. 1 will be described. The manufacturing device shown in FIG. 1 includes liquid tanks 31, 32, and 33; heating means 34 (34a to 34c); liquid pressurizing and feeding means 35a, 35b, and 35c; a reaction flow path 36; a cooling element 37; a filtering means 38, a pressure-regulating valve (back pressure valve) 39; and a recovery element 40. Fluids are fed from the various fluid tanks to feed passage 100, flow path 101, and flow path 102. In the drawings, there are three heating means. However, this is just an example and not a limit.

In the manufacturing devices shown in FIGS. 3 to 5, liquid tanks 41 and 42; liquid pressurizing and feeding means 35d and 35e; and fluid paths 103, 104, and 105 are contained in addition to, or in place of some portion of, the above configuration.

In one embodiment, water such as pure water or distilled water is introduced to liquid tank 31, hexagonal ferrite precursor solution is introduced to liquid tank 32, and an organic compound solution is introduced to liquid tank 33. The water that is introduced to liquid tank 31 is fed into feed passage 100 while being pressurized by liquid pressurizing and feeding means 35a, and heated by heating means 34. This heating and pressurizing is conducted to put the water in a high-temperature, high-pressure state, and is desirably conducted to achieve a subcritical to supercritical state. Water that is in a subcritical to supercritical state can exhibit high reactivity. Thus, contact with water in such a state can instantaneously put the hexagonal ferrite precursor in a highly reactive state, making it possible for ferrite conversion to occur quickly. Generally, water assumes a subcritical to supercritical state when heated to greater than or equal to 200° C. and pressurized to greater than or equal to 20 MPa. Accordingly, the above heating and pressurizing of water is desirably conducted to a temperature of greater than or equal to 200° C. and a pressure of greater than or equal to 20 MPa. The high-temperature, high-pressure water that has been heated and pressurized is fed into feed passage 100, reaching mixing element M1.

In FIG. 1, hexagonal ferrite precursor solution is fed from liquid tank 32 by liquid pressurizing and feeding means 35b to flow path 101, merging in mixing element M1 with feed passage 100 in which high-temperature, high-pressure water is being fed. Subsequently, the mixed flow of high-temperature, high-pressure water and hexagonal ferrite precursor solution merges in mixing element M2 with the organic compound solution that has been fed to flow path 102 by liquid pressurizing and feeding means 35c from liquid tank 33. As the reverse of this example, it is also possible for organic compound solution to be introduced into liquid tank 32 and hexagonal ferrite precursor solution to be introduced into liquid tank 33.

In FIG. 2, hexagonal ferrite precursor solution is fed from liquid tank 32 by liquid pressurizing and feeding means 35b to flow path 101. In mixing element M0, it merges with the organic compound solution that is being fed from liquid tank 33 by liquid pressurizing and feeding means 35c to flow path 102. Subsequently, the mixed flow of hexagonal ferrite precursor solution and organic compound solution passes via flow path 101 to mixing element M1, where it merges with high-temperature, high-pressure water. In FIG. 2, as the reverse of this example, it is also possible for organic compound solution to be introduced into liquid tank 32 and hexagonal ferrite precursor solution to be introduced into liquid tank 33.

Further, the manufacturing device shown in FIG. 3 and the manufacturing device shown in FIG. 4 are manufacturing devices that are suited to embodiments in which the preparation of hexagonal ferrite precursor solution is also conducted in a continuous manufacturing process. In the manufacturing device shown in FIG. 3 and the manufacturing device shown in FIG. 4, a water-based solution containing an iron salt and divalent metal atoms (also referred to as a "starting material solution" hereinafter) is introduced into liquid tank 41 and base-containing water-based solution (which normally does not contain iron salts or divalent metal salts) is introduced into tank 42. Starting material solution that has been feed from liquid tank 41 by liquid pressurizing and feeding means 35d to pipe 103 and base-containing water-based solution that has been fed from liquid tank 42 by liquid pressurizing and feeding means 35e to pipe 104 are merged in mixing element M4. As the reverse of the above example, it is possible for base-containing water-based solution to be introduced into liquid tank 41 and starting material solution to be introduced into liquid tank 42.

In the device shown in FIG. 3, the mixed flow thus obtained passes over flow path 105 and merges in mixing element M1 with high-temperature, high-pressure water that has been fed from liquid tank 31 by liquid pressurizing and feeding means 35a to flow path 100 and heated by heating means 34. The mixed flow thus obtained is merged in mixing element M2 with the organic compound solution fed from liquid tank 33 by liquid pressuring and feeding means 35c to flow path 102.

In the device shown in FIG. 4, the mixed flow thus obtained passes over flow path 105 and merges in mixing element M2 with a mixed flow that has been obtained by merging in mixing element M1 high-temperature, high-pressure water that has been fed from liquid tank 31 by liquid pressurizing and feeding means 35a to flow path 100 and heated by heating means 34 with an organic compound solution fed from liquid tank 33 by liquid pressurizing and feeding means 35c to flow path 102.

Details of the subsequent processes of the manufacturing device shown in FIG. 3 and the manufacturing device shown in FIG. 4 are as described for the manufacturing device shown in FIG. 1 above.

In the manufacturing device shown in FIG. 5, a water-based solution (starting material solution) containing an iron salt and a divalent metal salt is introduced into liquid tank 41 and a base-containing water-based solution (normally not containing an iron salt or a divalent metal salt) is introduced into liquid tank 42. Starting material solution fed from liquid tank 41 by liquid pressurizing and feeding means 35d to pipe 103 is merged in mixing element M4 with base-containing water-based solution fed from liquid tank 42 by liquid pressurizing and feeding means 35e to pipe 104. As the reverse of this example, it is also possible to introduce base-containing water-based solution to liquid tank 41 and introduce starting material solution to liquid tank 42.

The mixed liquid thus obtained is then merged in mixing element M5 of flow path 105 with the organic compound solution fed from liquid tank 33 by liquid pressurizing and feeding means 35c to pipe 102. The mixed flow thus obtained is then merged in mixing element M1 with high-temperature, high-pressure water fed from liquid tank 31 by liquid pressurizing and feeding means 35a to flow path 100 and heated by heating means 34.

Details of the subsequent process are as described for the manufacturing device shown in FIG. 2.

After having been mixed in the above mixing elements, the mixed flow of high-temperature, high-pressure water, hexagonal ferrite precursor, and organic compound (water-based solution containing hexagonal ferrite precursor, organic compound, and water) passes over feed passage 100 and is fed to reaction flow path 36. The mixed flow is heated in reaction flow path 36 and pressurized by liquid pressurizing and feeding means 35a to place the water contained in the mixed flow in reaction flow path 36 into a high-temperature, high-pressure state, desirably into a subcritical to supercritical state. Conversion of the hexagonal ferrite precursor to ferrite can progress. Subsequently, the solution containing particles of hexagonal ferrite, obtained by converting hexagonal ferrite precursor to ferrite, is discharged through discharge outlet D1. The solution that has been discharged is fed to cooling element 37 and cooled in cooling element 37. Subsequently, the solution that has been discharged through discharge outlet D2 of cooling element 37 is filtered in a filtering means (filter or the like) 38 to capture the particles of hexagonal ferrite. The particles of hexagonal ferrite that have been captured by filtering means 38 are released from filtering means 38, pass through pressure-regulating valve 39, and are recovered by recovery element 40.

As regards heating and pressurizing reaction flow path 36, a reaction system in which water is present can be heated to greater than or equal to 300° C. and pressurized to greater than or equal to 20 MPa to place the water in a subcritical to supercritical state, creating a highly reactive reaction field. Placing hexagonal ferrite precursor in such a state can cause rapid conversion to ferrite, yielding hexagonal ferrite. Accordingly, the heating temperature is desirable a temperature that renders the mixed flow within the reaction flow path greater than or equal to 300° C. The heating temperature is preferably set to render the liquid temperature of the water-based solution that is discharged from the reaction flow path and fed to the cooling element greater than or equal to 350° C. and less than or equal to 450° C. Here, the liquid temperature refers to the temperature of the liquid at the discharge outlet of the reaction flow path (discharge outlet D1 in the devices shown in FIGS. 1 to 5). Conducting the reaction that converts hexagonal ferrite precursor to hexagonal ferrite under temperature conditions at which the liquid temperature at the discharge outlet of the reaction flow path falls within this range is desirable from the perspective of enhancing the magnetic characteristics of the hexagonal ferrite powder obtained. The present inventors presume this to be the reason for the enhanced crystallinity of the hexagonal ferrite powder. This liquid temperature is preferably greater than or equal to 360° C. and less than or equal to 430° C., and more preferably, greater than or equal to 380° C. and less than or equal to 420° C. The pressure that is applied to the mixed flow within the reaction flow path is desirably greater than or equal to 20 MPa, preferably falling within a range of 20 MPa to 50 MPa.

The period from when a given position in the mixed flow is introduced into the reaction flow path to when it is discharged will be referred to as the "reaction time." The average particle size of the hexagonal ferrite powder that is prepared can be controlled by means of the reaction time. By way of example, the reaction time can be from 1 second to 120 seconds. However, there is no limitation to this range. The reaction time can be adjusted by either, or both, the dimensions of the reaction flow path (for example, the length of the flow path) and the speed of the mixed flow within the reaction flow path.

As set forth above, the water-based solution that has been discharged from the reaction flow path can be cooled in the cooling element. Cooling in the cooling element can completely stop the reaction that converts hexagonal ferrite precursor to hexagonal ferrite. This is desirable in order to obtain hexagonal ferrite powder with little variation in particle size. For this reason, the cooling in the cooling element is desirably conducted at a liquid temperature of the water-based solution in the cooling element of less than or equal to 100° C., and preferably conducted at a liquid temperature of greater than equal to room temperature (20 to 25° C.) and less than or equal to 100° C. Cooling can be conducted using a known cooling means, such as a water cooling device that cools the interior by circulating cold water, for example. The same pressure as in the feed passage and reaction flow path is normally applied to the water-based solution in the cooling element.

In the manufacturing method set forth above, it is desirable to employ high pressure-use metal piping as the feed passages and flow paths (also referred to as "piping" hereinafter) to apply pressure to the fluids that are fed through the interior. The metal constituting the piping is desirably SUS (Special Use Stainless Steel) 316, SUS 304, or some other stainless steel, or a nickel-based alloy such as Inconel (Japanese registered trademark) or Hastelloy (Japanese registered trademark) because of their low-corrosion properties. However, there is no limitation thereto. Equivalent or similar materials can also be employed. The piping of laminate structure described in Japanese Unexamined Patent Publication (KOKAI) No. 2010-104928, which is expressly incorporated herein by reference in its entirety, can also be employed.

In the manufacturing devices shown in FIGS. 1 to 5, the various mixing elements have structures such that pipes are joined by T-joints. The reactors described in Japanese Unexamined Patent Publication (KOKAI) Nos. 2007-268503, 2008-12453, 2010-75914, and the like, which are expressly incorporated herein by reference in their entirety, can be employed as the mixing elements. The material of the reactor is desirably the material described in Japanese Unexamined Patent Publication (KOKAI) No. 2007-268503, 2008-12453, or 2010-75914, which are expressly incorporated herein by reference in their entirety. Specifically, the metals set forth above as being suitable for constituting piping are desirable. However, there is no limitation thereto, and equivalent or similar materials can be employed. Combination with low-corrosion titanium alloys, tantalum alloy, ceramics and the like is also possible.

Some specific embodiments of methods of manufacturing hexagonal ferrite powder according to an aspect of the present invention have been described above. However, the present invention is not limited to these specific embodiments.

Magnetic Recording Medium

An aspect of the present invention relates to a magnetic recording medium having a magnetic layer containing ferromagnetic powder and binder on a nonmagnetic support, in which the ferromagnetic powder is the above hexagonal ferrite powder.

The above magnetic recording medium will be described in greater detail below.

<Magnetic Layer>

Details regarding the ferromagnetic powder (hexagonal ferrite powder) contained in the magnetic layer are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed in any content with the above resin.

Additives can be added to the magnetic layer as needed. Examples of additives are abrasives, lubricants, dispersing agents, dispersion adjuvants, fungicides, antistatic agents, oxygen inhibitors, and carbon black. The additives described above can be suitably selected for use from among commercial products based on the properties that are desired.

<Nonmagnetic Layer>

The nonmagnetic layer will be described next. The magnetic recording medium according to an aspect of the present invention can have a magnetic layer directly on a nonmagnetic support, or can have a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to paragraphs 0036 to 0039 of Japanese Unexamined Patent Publication (KOKAI) No. 2010-24113.

Known techniques with regard to magnetic layer and/or nonmagnetic layer can be applied for binders, lubricants, dispersing agents, additives, solvents, dispersion methods, and the like of the nonmagnetic layer. Carbon black and/or organic material powders can also be added to the nonmagnetic layer. In this regard, by way of example, reference can be made to paragraphs 0040 to 0042 of Japanese Unexamined Patent Publication (KOKAI) No. 2010-24113.

<Nonmagnetic Support>

Examples of nonmagnetic supports (also simply referred to as "supports", hereinafter) are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable. These supports can be subjected in advance to corona discharge, plasma treatment, adhesion-enhancing treatment, heat treatment, or the like.

<Thickness of Nonmagnetic Support and Various Layers>

The thickness of the nonmagnetic support and the various layers is as follows.

The thickness of the nonmagnetic support is desirably 3 μm to 80 μm. The thickness of the magnetic layer, which can be optimized based on the saturation magnetization level of the magnetic head employed, the head gap length, and the bandwidth of the recording signal, is generally 10 nm to 150 nm, desirably 20 nm to 120 nm, and preferably, 30 nm to 100 nm. It suffices for the magnetic layer to comprise at least one layer. The magnetic layer can be divided into two or more layers having different magnetic characteristics, and known configurations relating to multilayer magnetic layers can be applied. For a multilayer magnetic layer, the thickness of the magnetic layer refers to the combined thickness of the multiple magnetic layers.

The thickness of the nonmagnetic layer is, for example, 0.1 μm to 3.0 μm, desirably 0.1 μm to 2.0 μm, and preferably, 0.1 μm to 1.5 μm. The nonmagnetic layer of the above magnetic recording medium includes substantially nonmagnetic layers, for example, containing small quantities of ferromagnetic powder, either as impurities or intentionally, in addition to nonmagnetic powder. The term "substantially nonmagnetic layer" refers to a layer in which the residual magnetic flux density is less than or equal to 10 mT, or the coercive force is less than or equal to 7.96 kA/m (100 Oe), or the residual magnetic flux density is less than or equal to 10 mT and the coercive force is less than or equal to 7.96 kA/m (100 Oe). The nonmagnetic layer desirably has no residual magnetic flux density or coercive force.

<Backcoat Layer>

The above magnetic recording medium can have a backcoat layer on the opposite surface of the nonmagnetic support from the surface on which the magnetic layer is present. The backcoat layer is a layer that contains nonmagnetic powder and binder. The nonmagnetic powder is desirably in the form of carbon black and/or an inorganic powder. Known techniques with regard to magnetic layer, nonmagnetic layer and backcoat layer can be applied to the binders and various additives for forming the backcoat layer. The thickness of the backcoat layer is desirably less than or equal to 0.9 μm and preferably 0.1 μm to 0.7 μm.

<Manufacturing Method>

The process of preparing the compositions for forming the various layers such as the magnetic layer, nonmagnetic layer and backcoat layer normally contains at least a kneading step, dispersion step, and mixing steps that are provided as needed before and after these steps. Each of these steps can be divided into two or more stages. Various components can be added at the outset, or in the course of, any step. Individual components can be divided and added during two or more steps. For example, binder can be divided and added at the kneading step, dispersion step, and mixing step for adjusting the viscosity after the dispersion. Manufacturing techniques that have been conventionally known can be applied. A powerful kneading device, such as an open kneader, continuous kneader, pressurized kneader, or extruder is desirably employed in the kneading step. Details of these kneading processes are given in Japanese Unexamined Patent Publication (KOKAI) Nos. Heisei 1-106338 and 1-79274, which are expressly incorporated herein by reference in their entirety. Glass beads and other types of beads can be employed to disperse the various layer-forming compositions. High specific gravity dispersion beads in the form of zirconia beads, titania beads, and steel beads are suitable as such dispersion beads. These dispersion beads can be employed by optimizing their diameters (bead diameter) and fill rates. A known dispersion apparatus can be employed.

Reference can be made to paragraphs 0051 to 0057 of Japanese Unexamined Patent Publication (KOKAI) No. 2010-24113, for details regarding the manufacturing method of the magnetic recording medium.

The magnetic recording medium according to an aspect of the present invention that has been set forth above can exhibit good electromagnetic characteristics by incorporating the hexagonal ferrite powder according to an aspect of the present invention into the magnetic layer.

Examples

The present invention will be described in greater detail below through Examples. However, the present invention is not limited to the embodiments given in Examples. The "parts" and "% (percent)" given below are "weight parts" and "weight %" unless specifically stated otherwise.

[Fabrication of Hexagonal Ferrite Powder 1-1]

(1) Preparation of Precursor-Containing Aqueous Solution

A 0.5 L aqueous solution containing barium salt and iron salt was prepared by dissolving barium salt in the form of barium nitrate ($Ba(NO_3)_2$) and iron salt in the form of iron(III) nitrate ($Fe(NO_3)_3 \cdot 9H_2O$) in pure water. The combined quantity of iron salt and barium salt in the aqueous solution that was prepared was 0.20 mol and the molar ratio of "Ba/Fe" was 1.5. To this aqueous solution was added 0.5 L of a 0.4 mol/L potassium hydroxide aqueous solution to prepare 1.0 L of precursor-containing aqueous solution.

(2) Preparation of Hexagonal Ferrite for Use in the Continuous Hydrothermal Synthesis Method The aqueous solution (sol) prepared in (1) above was introduced into liquid tank 32 of the manufacturing device shown in FIG. 1. An organic compound solution was introduced into liquid tank 33. SUS316BA tube was employed for the piping of the manufacturing device. The organic compound solution was an aqueous solution with a 10 weight % concentration of sodium octanoate that was prepared by dissolving sodium octanoate in water.

The pure water that had been introduced into liquid tank 31 was heated by a heating means (heater) 34 while being fed by liquid pressurizing and feeding means (high pressure pump) 35a to cause high-temperature, high-pressure water to flow through pipe 100. In this process, heating and pressurizing were controlled so that the temperature of the high-temperature, high-pressure water after flowing through heating means 34c was 350° C. and the pressure was 30 MPa.

The aqueous solution (sol) that had been introduced into liquid tank 32 was fed to pipe 101 by liquid pressurizing and feeding means (high pressure pump) 35b at a liquid temperature of 25° C. and mixed with the above high-temperature, high-pressure water in mixing element M1.

The organic compound solution that had been introduced into liquid tank 33 was fed to pipe 102 by liquid pressurizing and feeding means (high pressure pump) 35c and mixed with the mixed solution of high-temperature, high-pressure water and aqueous solution (sol) in mixing element M2. Here, the flow rate of the organic compound solution was adjusted and it was fed and mixed so that the molar ratio of the "organic compound/Fe" assumed the value indicated in Table 1 for the iron atoms contained in the mixed flow fed to reaction flow path 36.

The mixed flow thus obtained was then fed and heated and pressurized for a reaction time of 20 seconds in reaction flow path 36 to convert the hexagonal ferrite precursor to hexagonal ferrite. The pressure within reaction flow rate 36 was 30 MPa and the heating temperature was such that the liquid temperature (measured with a thermocouple) at the discharge outlet D1 of reaction flow path 36 was 400° C.

Subsequently, the liquid containing particles of hexagonal ferrite was discharged from reaction flow path 36 and cooled to a liquid temperature of less than or equal to 100° C. in cooling element 37 equipped with a water cooling mechanism. Subsequently, it passed through pressure regulating valve 39 and was recovered in recovery element 40. The particles that were collected were washed with ethanol and then centrifuged to separate out the hexagonal ferrite powder.

Hexagonal ferrite powder 1-1 was thus obtained.

[Fabrication of Hexagonal Ferrite Powders 1-2 to 1-14]

With the exception that one or more from among the type of barium salt employed, the "Ba/Fe" molar ratio, the type of organic compound, and the "organic compound/Fe" molar ratio were changed as indicated in Table 1, hexagonal ferrite powders 1-2 to 1-14 were obtained by the same method as in the fabrication of hexagonal ferrite powder 1-1.

[Fabrication of Hexagonal Ferrite Powder 2-1]

(1) Preparation of Precursor-Containing Aqueous Solution

A 0.5 L quantity of an aqueous solution containing iron salt was prepared by dissolving an iron salt in the form of iron(III) nitrate ($Fe(NO_3)_3 \cdot 9H_2O$) in pure water. The quantity of iron salt in the aqueous solution prepared was 0.050 mol. To the aqueous solution was added 0.5 L of 0.4 mol/L potassium hydroxide aqueous solution and 1.0 L of aqueous solution was prepared. This aqueous solution was triple decanted to separate the precipitate containing the iron atoms. An aqueous solution containing 0.15 mol of barium nitrate was added to the precipitate and the mixture was stirred and redispersed to prepare 1.0 L of precursor-containing aqueous solution.

(2) Preparation of Hexagonal Ferrite by Continuous Hydrothermal Synthesis Method With the exception that the precursor-containing aqueous solution prepared in (1) above was employed, hexagonal ferrite powder 2-1 was obtained by the same method as hexagonal ferrite powder 1-1.

[Fabrication of Hexagonal Ferrite Powders 2-2 to 2-5]

With the exception that one or more from among the type of barium salt employed, the "Ba/Fe" molar ratio, the type of organic compound, and the "organic compound/Fe" molar ratio were changed as indicated in Table 1, hexagonal ferrite powders 2-2 to 2-5 were obtained by the same method as in the fabrication of hexagonal ferrite powder 2-1.

[Fabrication of Hexagonal Ferrite Powder 3-1]

(1) Preparation of Starting Material Solution and Base-Containing Aqueous Solution An aqueous solution (starting material solution) containing iron salt and barium salt was prepared by dissolving a barium salt in the form of barium nitrate ($Ba(NO_3)_2$) and an iron salt in the form of iron(III) nitrate ($Fe(NO_3)_3 \cdot 9H_2O$) in pure water. The combined concentration of iron salt and barium salt in the starting material solution prepared was 0.075 mol/L, and the "Ba/Fe" molar ratio was 0.5. Potassium hydroxide was added to water and dissolved to prepare a 0.2 mol/L base-containing aqueous solution.

(2) Preparation of Organic Compound Solution

Sodium octanoate was dissolved in water to prepare an aqueous solution with a 10 weight % concentration of sodium octanoate (organic compound solution).

(3) Preparation of Hexagonal Ferrite by Continuous Hydrothermal Synthesis Method The starting material solution prepared in (1) above was introduced into liquid tank 41 of the manufacturing device shown in FIG. 3. The base-containing aqueous solution prepared in (1) above was introduced into liquid tank 42. And the organic compound solution prepared in (2) above was introduced into liquid tank 33. SUS316BA tube was employed as the piping of the manufacturing device.

The pure water that had been introduced into liquid tank 31 was heated by heating means (heater) 34 while being fed by a liquid pressurizing and feeding means (high pressure pump 35a), causing high-temperature, high-pressure water to flow through pipe 100. In this process, heating and pressurizing were controlled so that the temperature of the high-temperature, high-pressure water in the liquid feed path after passing through heating means 34c was 350° C. and the pressure was 30 MPa.

The starting material solution and the base-containing solution were fed to pipe 103 or 104 at a liquid temperature of 25° C. using liquid pressurizing and feeding means (high pressure pumps) 35d and 35e, respectively, such that the ratio by volume of the starting material solution:base containing aqueous solution=50:50. After mixing in mixing element M4, the mixed flow was fed to pipe 105 and mixed with the above high-temperature, high-pressure water in mixing element M1.

Additionally, the organic compound solution was fed to pipe 102 at a liquid temperature of 25° C. using liquid pressurizing and feeding means (high pressure pump) 35c such that the ratio by volume of the (starting material solution+base containing aqueous solution): organic compound solution=40:60. It was then mixed in mixing element M1 with the mixed flow obtained by the above mixing. Here, the flow rate of the organic compound solution was adjusted and it was fed and mixed so that the molar ratio of the "organic compound/Fe" assumed the value shown in Table 1 for the iron atoms contained in the mixed flow fed to reaction flow path 36.

The mixed flow thus obtained was then fed and heated and pressurized for a reaction time of 20 seconds in reaction flow path 36 to convert the hexagonal ferrite precursor to hexagonal ferrite. The pressure in reaction flow path 36 was 30 MPa and the heating temperature as the liquid temperature (measured with a thermocouple) at discharge outlet D1 of reaction flow path 36 was 400° C.

Subsequently, the liquid containing particles of hexagonal ferrite was discharged from reaction flow path 36 and cooled to a liquid temperature of less than or equal to 100° C. in cooling element 37 equipped with a water cooling mechanism. It then passed through pressure regulating valve 39 and was recovered in recovery element 40. The particles that were collected were washed with ethanol and then centrifuged to separate out the hexagonal ferrite powder.

Hexagonal ferrite powder 3-1 was thus obtained.

[Fabrication of Hexagonal Ferrite Powders 3-2 and 3-3]

With the exceptions that the type of barium salt employed and the molar ratio "Ba/Fe" were changed as shown in Table 1, hexagonal ferrite powders 3-2 and 3-3 were obtained by the same method as in the fabrication of hexagonal ferrite powder 3-1.

[Fabrication of Hexagonal Ferrite Powder 4-1 (Glass Crystallization Method)]

Starting materials for fabricating hexagonal ferrite powder by the glass crystallization method in the form of $BaCO_3$, $Fe_2O_3$, and $Na_2B_4O_7$ were mixed and melted at 1,200° C. in an alumina crucible. The melt was then quenched to obtain an amorphous material.

Next, the amorphous material was heat treated for 12 hours at 580° C. in an electric furnace. The glass component was removed with a 10% acetic acid solution (liquid temperature: 85° C.), cleaned, and dried to obtain hexagonal ferrite powder.

[Fabrication of Hexagonal Ferrite Powder 4-2 (Glass Crystallization Method)]

With the exception that the heat treatment temperature was changed to 550° C., hexagonal ferrite powder 4-2 was obtained by the same method as in the fabrication of hexagonal ferrite powder 4-1.

[Powder Evaluation Methods]

(1) X-Ray Diffraction Analysis

When sample powder was collected from the powder fabricated above and analyzed by X-ray diffraction, it was confirmed to be hexagonal barium ferrite (magnetoplumbite type).

(2) Average Particle Size of Hexagonal Ferrite Powder

The average particle size of the hexagonal ferrite powder fabricated above was determined by the method set forth above.

(3) Magnetic Characteristics ($SFD_{23° C.}$, $SFD_{-190° C.}$, Saturation Magnetization, Coercive Force $Hc_{23° C.}$, $Hc_{-190° C.}$)

The various above magnetic characteristics were measured using a vibrating sample magnetometer (made by Toei-Kogyo Co., Ltd.) in an applied magnetic field of 796 kA/m (10 kOe).

The ratio ($SFD_{-190° C.}/SFD_{23° C.}$) was determined from the measured values. The coercive force ratio ($Hc_{-190° C.}/Hc_{23° C.}$) was also determined from the measured values. The coercive force was calculated by converting the value measured with the above vibrating sample magnetometer in Oe units by means of the conversion equation $10e=79.6\times 10^{-3}$ kA/m. The coercive force ratio ($Hc_{-190° C.}/Hc_{23° C.}$) was obtained as a ratio for the value (unit:kA/m) converted using this conversion equation.

A description will be given below applying the same numbers to magnetic recording media (magnetic tapes) as the numbers of the hexagonal ferrite powder contained in the magnetic layer. Accordingly, for example, the magnetic tape containing hexagonal ferrite powder 1-1 in the magnetic layer thereof is magnetic tape 1-1 and the magnetic tape containing hexagonal ferrite powder 2-1 in the magnetic layer thereof is magnetic tape 2-1.

[Fabrication of Magnetic Recording Media (Magnetic Tapes)]

(1) Formula of Magnetic Layer Composition (Magnetic liquid)

| | |
|---|---|
| Ferromagnetic powder (recorded in Table 1): | 100.0 parts |
| SO$_3$Na group-containing polyurethane resin: | 14.0 parts |
| (weight average molecular weight: 70,000, SO$_3$Na groups: 0.4 meq/g) | |
| Cyclohexanone: | 150.0 parts |
| Methyl ethyl ketone: | 150.0 parts |

(Abrasive liquid)

| | |
|---|---|
| Abrasive liquid A, alumina abrasive (average particle size: 100 nm): | 3.0 parts |
| Sulfonic acid group-containing polyurethane resin: | 0.3 part |
| (weight average molecular weight: 70,000, SO$_3$Na groups: 0.3 meq/g) | |
| Cyclohexanone: | 26.7 parts |
| Abrasive liquid B, diamond abrasive (average particle size: 100 nm): | 1.0 part |
| Sulfonic acid group-containing polyurethane resin: | 0.1 part |
| (weight average molecular weight: 70,000, SO$_3$Na groups: 0.3 meq/g) | |
| Cyclohexanone: | 26.7 parts |

(Silica sol)

| | |
|---|---|
| Colloidal silica (average particle size: 100 nm): | 0.2 part |
| Methyl ethyl ketone: | 1.4 parts |

(Other components)

| | |
|---|---|
| Stearic acid: | 2.0 parts |
| Butyl stearate: | 6.0 parts |
| Polyisocyanate (Coronate made by Nippon Polyurethane Industry Co., Ltd.) | 2.5 parts |

(Solvents added to finish)

| | |
|---|---|
| Cyclohexanone: | 200.0 parts |
| Methyl ethyl ketone: | 200.0 parts |

(2) Formula of nonmagnetic layer composition

| | |
|---|---|
| Nonmagnetic inorganic powder α-iron oxide: | 100.0 parts |
| Average particle size: 10 nm | |
| Average acicular ratio: 1.9 | |
| BET specific surface area: 75 m$^2$/g | |
| Carbon black (average particle size: 20 nm): | 25.0 parts |
| Sulfonic acid group-containing polyurethane resin: | 18.0 parts |
| (weight average molecular weight: 70,000, SO$_3$Na groups: 0.2 meq/g) | |
| Stearic acid: | 1.0 part |
| Cyclohexanone: | 300.0 parts |
| Methyl ethyl ketone: | 300.0 parts |

(3) Formula of backcoat layer composition

| | |
|---|---|
| Nonmagnetic inorganic powder α-iron oxide: | 80.0 parts |
| Average particle size: 0.15 μm | |
| Average acicular ratio: 7 | |
| BET specific surface area: 52 m$^2$/g | |
| Carbon black (average particle size: 20 nm): | 20.0 parts |
| Vinyl chloride copolymer: | 13.0 parts |
| Sulfonic acid group-containing polyurethane resin: | 6.0 parts |
| Phenylphosphonic acid | 3.0 parts |
| Cyclohexanone: | 155.0 parts |
| Methyl ethyl ketone: | 155.0 parts |
| Stearic acid: | 3.0 parts |
| Butyl stearate: | 3.0 parts |
| Polyisocyanate: | 5.0 parts |
| Cyclohexanone: | 200.0 parts |

(4) Fabrication of Magnetic Tapes

The above magnetic liquid was dispersed for 24 hours in a batch-type vertical sand mill. Zirconia beads 0.5 mmΦ in diameter were employed as dispersion beads. The abrasive liquid was dispersed for 24 hours in a batch-type ultrasonic device (20 kHz, 300 W). These dispersions were mixed with the other components (silica sol, other components, and solvents added to finish) and then processed for 30 minutes in a batch-type ultrasonic device (20 kHz, 300 W). Subsequently, the mixture was filtered with a filter having an average pore diameter of 0.5 μm to fabricate a magnetic layer composition.

For the nonmagnetic layer composition, the various components were dispersed for 24 hours in a batch-type vertical sand mill. Zirconia beads 0.1 mmΦ in diameter were employed as dispersion beads. The dispersion obtained was filtered with a filter having an average pore diameter of 0.5 μm to fabricate a nonmagnetic layer composition.

For the backcoat layer composition, the various components excluding the lubricants (stearic acid and butyl stearate), the polyisocyanate, and 200.0 parts of the cyclohexanone were kneaded and diluted in an open kneader and then subjected to 12 passes of dispersion processing, each pass comprising a retention time of 2 minutes, at a rotor top peripheral speed of 10 m/s and a bead fill rate of 80 volume % using zirconia beads 1 mmΦ in diameter in a horizontal-type bead mill disperser. Subsequently, the remaining components were added to the dispersion and the mixture was stirred in a dissolver. The dispersion obtained was then filtered with a filter having an average pore diameter of 1 μm to fabricate a backcoat layer composition.

Subsequently, the nonmagnetic layer composition was coated to a thickness following drying of 0.1 μm on a polyethylene naphthalate film (support) 5 μm in thickness, after which the magnetic layer composition was coated thereover to a thickness upon drying of 70 nm. While the magnetic layer composition was still wet, a perpendicular orientation treatment was conducted by applying a magnetic field with a field strength of 0.6 T in a direction perpendicular to the coated surface. The coating was then dried. Subsequently, the backcoat layer composition was coated and dried on the opposite surface of the support to a dry thickness of 0.4 μm.

Subsequently, a surface smoothing treatment (calender treatment) was conducted at a calender roll surface temperature of 100° C., a linear pressure of 300 kg/cm (294 kN/m), and a speed of 100 m with a calender comprised solely of metal rolls. Then, a heat treatment was conducted for 36 hours in an environment with an atmospheric temperature of 70° C. Following the heat treatment, the product was slit to ½ inch (0.0127 meter) width to obtain a magnetic tape.

[Method of Evaluating the Electromagnetic Characteristics of the Magnetic Tapes]

A magnetic signal was recorded in the longitudinal direction of the tape under the following conditions on each of the magnetic tapes that had been fabricated, and reproduced with a magnetoresistive (MR) head. The reproduced signal was frequency analyzed with a spectrum analyzer made by Shibasoku. The ratio of the 300 kfci output and the noise integrated over a range of 0 to 600 kfci was adopted as the SNR.

| (Recording and reproduction conditions) | | |
|---|---|---|
| Recording: | Recording track width: | 5 μm |
| | Recording gap: | 0.17 μm |
| | Head saturation flux density Bs: | 1.8 T |
| Reproduction: | Reproduction track width: | 0.4 μm |
| | Shield spacing (sh-sh distance): | 0.08 μm |
| | Recording wavelength: | 300 kfci |

Table 1 gives the above results.

TABLE 1

| | | 1-1 | 1-2 | 1-3 | 1-4 | 1-5 |
|---|---|---|---|---|---|---|
| | Type of barium salt | $Ba(NO_3)_2$ | $Ba(OH)_2$ | $(CH_3COO)_2Ba$ | $(CH_3COO)_2Ba$ | $(CH_3COO)_2Ba$ |
| | Ba/Fe (molar ratio) | 1.5 | 1.5 | 5.0 | 10.0 | 20.0 |
| | Type of organic compound | Sodium octanoate | Sodium octanoate | Sodium octanoate | Sodium octanoate | Sodium octanoate |
| | Organic compound/Fe (molar ratio) | 10.0 | 10.0 | 10.0 | 10.0 | 10.0 |
| Evaluation of powder | Average particle size | 26 nm | 24 nm | 20 nm | 16 nm | 12 nm |
| | Saturation magnetization (23° C.) [A·m²/kg] | 47.6 | 46.6 | 33.2 | 48.9 | 45.3 |
| | Coercive force $Hc_{23° C.}$ [kA/m] | 213 | 149 | 189 | 189 | 171 |
| | Coercive force $Hc_{23° C.}$ [Oe] | 2670 | 1870 | 2380 | 2380 | 2150 |
| | $SFD_{23° C.}$ | 0.31 | 0.37 | 0.25 | 0.20 | 0.22 |
| | Coercive force $Hc_{-190° C.}$ [kA/m] | 216 | 146 | 185 | 189 | 177 |
| | Coercive force $Hc_{-190° C.}$ [Oe] | 2710 | 1840 | 2330 | 2380 | 2220 |
| | $SFD_{-190° C.}$ | 0.41 | 0.47 | 0.23 | 0.23 | 0.25 |
| | $Hc_{-190° C.}/Hc_{23° C.}$ | 1.01 | 0.98 | 0.98 | 1.00 | 1.03 |
| | $SFD_{-190° C.}/SFD_{23° C.}$ | 1.32 | 1.27 | 0.92 | 1.15 | 1.14 |
| Evaluation of magnetic tape | SNR [dB] | 0.6 | 0.4 | 0.9 | 1.2 | 1.5 |
| | Ex./Comp. Ex. | Ex. | Ex. | Ex. | Ex. | Ex. |

| | | 1-6 | 1-7 | 1-8 | 1-9 | 1-10 |
|---|---|---|---|---|---|---|
| | Type of barium salt | $Ba(NO_3)_2$ | $(CH_3COO)_2Ba$ | $(CH_3COO)_2Ba$ | $(CH_3COO)_2Ba$ | $(CH_3COO)_2Ba$ |
| | Ba/Fe (molar ratio) | 0.5 | 20.0 | 20.0 | 20.0 | 20.0 |
| | Type of organic compound | Sodium octanoate | Sodium octanoate | Sodium octanoate | Sodium octanoate | Oleic acid |
| | Organic compound/Fe (molar ratio) | 10.0 | 5.0 | 20.0 | 50.0 | 10.0 |

TABLE 1-continued

| Evaluation of powder | Average particle size | 58 nm | 35 nm | 12 nm | 8 nm | 14 nm |
|---|---|---|---|---|---|---|
| | Saturation magnetization (23° C.) [A·m²/kg] | 49.3 | 49.1 | 46.2 | 16.0 | 41.3 |
| | Coercive force $Hc_{23°\ C.}$ [kA/m] | 176 | 179 | 185 | 131 | 158 |
| | Coercive force $Hc_{23°\ C.}$ [Oe] | 2210 | 2250 | 2320 | 1650 | 1980 |
| | $SFD_{23°\ C.}$ | 1.1 | 0.6 | 0.21 | 0.29 | 0.30 |
| | Coercive force $Hc_{-190°\ C.}$ [kA/m] | 176 | 180 | 183 | 137 | 158 |
| | Coercive force $Hc_{-190°\ C.}$ [Oe] | 2210 | 2260 | 2300 | 1720 | 1990 |
| | $SFD_{-190°\ C.}$ | 1.08 | 0.71 | 0.24 | 0.30 | 0.30 |
| | $Hc_{-190°\ C.}/Hc_{23°\ C.}$ | 1.00 | 1.00 | 0.99 | 1.04 | 1.01 |
| | $SFD_{-190°\ C.}/SFD_{23°\ C.}$ | 0.98 | 1.18 | 1.14 | 1.03 | 1.00 |
| Evaluation of magnetic tape | SNR [dB] | −1.5 | 0.2 | 1.3 | −0.7 | 1.2 |
| | Ex./Comp. Ex. | Comp. Ex. | Ex. | Ex. | Comp. Ex. | Ex. |

| | | 1-11 | 1-12 | 1-13 | 1-14 | 2-1 |
|---|---|---|---|---|---|---|
| Type of barium salt | | $(CH_3COO)_2Ba$ | $(CH_3COO)_2Ba$ | $Ba(NO_3)_2$ | $BaI_2$ | $Ba(NO_3)_2$ |
| Ba/Fe (molar ratio) | | 20.0 | 20.0 | 1.0 | 30.0 | 1.5 |
| Type of organic compound | | Dodecanedioic acid | 12-aminododecanoic acid | Sodium octanoate | Sodium octanoate | Sodium octanoate |
| Organic compound/Fe (molar ratio) | | 10.0 | 10.0 | 10.0 | 10.0 | 10.0 |
| Evaluation of powder | Average particle size | 12 nm | 15 nm | 46 nm | 12 nm | 25 nm |
| | Saturation magnetization (23° C.) [A·m²/kg] | 46.5 | 46.3 | 48.5 | 46.3 | 45.5 |
| | Coercive force $Hc_{23°\ C.}$ [kA/m] | 175 | 141 | 168 | 179 | 193 |
| | Coercive force $Hc_{23°\ C.}$ [Oe] | 2200 | 1770 | 2110 | 2250 | 2420 |
| | $SFD_{23°\ C.}$ | 0.23 | 0.22 | 0.97 | 0.23 | 0.29 |
| | Coercive force $Hc_{-190°\ C.}$ [kA/m] | 179 | 152 | 171 | 175 | 199 |
| | Coercive force $Hc_{-190°\ C.}$ [Oe] | 2250 | 1910 | 2150 | 2200 | 2500 |
| | $SFD_{-190°\ C.}$ | 0.24 | 0.21 | 0.99 | 0.22 | 0.32 |
| | $Hc_{-190°\ C.}/Hc_{23°\ C.}$ | 1.02 | 1.08 | 1.02 | 0.98 | 1.03 |
| | $SFD_{-190°\ C.}/SFD_{23°\ C.}$ | 1.04 | 0.95 | 1.02 | 0.96 | 1.10 |
| Evaluation of magnetic tape | SNR [dB] | 1.5 | 1.0 | −0.8 | 1.5 | 0.7 |
| | Ex./Comp. Ex. | Ex. | Ex. | Comp. Ex. | Ex. | Ex. |

| | | 2-2 | 2-3 | 2-4 | 2-5 | 3-1 |
|---|---|---|---|---|---|---|
| Type of barium salt | | $(CH_3COO)_2Ba$ | $(CH_3COO)_2Ba$ | $(CH_3COO)_2Ba$ | $Ba(NO_3)_2$ | $Ba(NO_3)_2$ |
| Ba/Fe (molar ratio) | | 10.0 | 20.0 | 20.0 | 0.5 | 1.5 |
| Type of organic compound | | Sodium octanoate | Sodium octanoate | — | Sodium octanoate | Sodium octanoate |
| Organic compound/Fe (molar ratio) | | 10.0 | 10.0 | 0.0 | 10.0 | 10.0 |
| Evaluation of powder | Average particle size | 15 nm | 12 nm | 16 nm | 52 nm | 27 nm |
| | Saturation magnetization (23° C.) [A·m²/kg] | 47.5 | 46.1 | 48.0 | 47.3 | 48.6 |
| | Coercive force $Hc_{23°\ C.}$ [kA/m] | 181 | 183 | 171 | 200 | 182 |
| | Coercive force $Hc_{23°\ C.}$ [Oe] | 2280 | 2300 | 2150 | 2510 | 2290 |
| | $SFD_{23°\ C.}$ | 0.24 | 0.21 | 0.28 | 1.36 | 0.32 |
| | Coercive force $Hc_{-190°\ C.}$ [kA/m] | 185 | 184 | 177 | 207 | 185 |
| | Coercive force $Hc_{-190°\ C.}$ [Oe] | 2330 | 2310 | 2220 | 2600 | 2330 |

TABLE 1-continued

|  |  |  |  |  |  |  |
|---|---|---|---|---|---|---|
|  | $SFD_{-190° C.}$ | 0.23 | 0.22 | 0.31 | 1.41 | 0.29 |
|  | $Hc_{-190° C.}/Hc_{23° C.}$ | 1.02 | 1.00 | 1.03 | 1.04 | 1.02 |
|  | $SFD_{-190° C.}/SFD_{23° C.}$ | 0.96 | 1.05 | 1.11 | 1.04 | 0.91 |
| Evaluation of magnetic tape | SNR [dB] | 1.1 | 1.5 | 1.0 | −1.4 | 0.4 |
|  | Ex./Comp. Ex. | Ex. | Ex. | Ex. | Comp. Ex. | Ex. |

|  |  | 3-2 | 3-3 | 4-1 | 4-2 |
|---|---|---|---|---|---|
|  | Type of barium salt | $(CH_3COO)_2Ba$ | $Ba(NO_3)_2$ | — | — |
|  | Ba/Fe (molar ratio) | 20.0 | 0.5 | — | — |
|  | Type of organic compound | Sodium octanoate | Sodium octanoate | — | — |
|  | Organic compound/Fe (molar ratio) | 10.0 | 10.0 | — | — |
| Evaluation of powder | Average particle size | 13 nm | 60 nm | 28 nm | 25 nm |
|  | Saturation magnetization (23° C.) [$A \cdot m^2/kg$] | 45.2 | 49.8 | 53.0 | 45.1 |
|  | Coercive force $Hc_{23° C.}$ [kA/m] | 187 | 169 | 185 | 187 |
|  | Coercive force $Hc_{23° C.}$ [Oe] | 2350 | 2120 | 2330 | 2350 |
|  | $SFD_{23° C.}$ | 0.22 | 1.91 | 0.77 | 0.73 |
|  | Coercive force $Hc_{-190° C.}$ [kA/m] | 188 | 178 | 233 | 280 |
|  | Coercive force $Hc_{-190° C.}$ [Oe] | 2360 | 2230 | 2930 | 3520 |
|  | $SFD_{-190° C.}$ | 0.24 | 1.8 | 0.44 | 0.38 |
|  | $Hc_{-190° C.}/Hc_{23° C.}$ | 1.00 | 1.05 | 1.26 | 1.50 |
|  | $SFD_{-190° C.}/SFD_{23° C.}$ | 1.09 | 0.94 | 0.57 | 0.52 |
| Evaluation of magnetic tape | SNR [dB] | 1.1 | −1.8 | −0.4 | 0 |
|  | Ex./Comp. Ex. | Ex. | Comp. Ex. | Comp. Ex. | Comp. Ex. |

Based on the results in Table 1, the magnetic tapes of Examples containing hexagonal ferrite powder with an average particle size falling within a range of 10 nm to 50 nm, an $SFD_{23° C.}$ of less than or equal to 0.80, and a ratio ($SFD_{-190° C.}/SFD_{23° C.}$) of greater than 0.80 were determined to exhibit better electromagnetic characteristics (a higher SNR) than the magnetic tapes of Comparative Examples.

An aspect of the present invention is useful in the technical field of magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Hexagonal ferrite powder, which has:
   an average particle size falling within a range of 10 nm to 50 nm;
   a switching field distribution $SFD_{23° C.}$ measured at a temperature of 23° C. falls within a range of 0.10 to 0.60; and
   a ratio of a switching field distribution $SFD_{-190° C.}$ that is measured at a temperature of −190° C. to the $SFD_{23° C.}$, $SFD_{-190° C.}/SFD_{23° C.}$, falls within a range of 0.90 to 1.50.

2. The hexagonal ferrite powder according to claim 1, which has a saturation magnetization of greater than or equal to 30.0 $A \cdot m^2/kg$.

3. The hexagonal ferrite powder according to claim 1, which has a coercive force of greater than or equal to 159 kA/m.

4. The hexagonal ferrite powder according to claim 1, wherein the average particle size falls within a range of 10 nm to 35 nm.

5. A magnetic recording medium,
which comprises a magnetic layer comprising ferromagnetic powder and binder on a nonmagnetic support,
wherein the ferromagnetic powder is hexagonal ferrite powder which has:
an average particle size falling within a range of 10 nm to 50 nm;
a switching field distribution $SFD_{23° C.}$ measured at a temperature of 23° C. falls within a range of 0.10 to 0.60; and
a ratio of a switching field distribution $SFD_{-190° C.}$ that is measured at a temperature of $-190°$ C. to the $SFD_{23° C.}$, $SFD_{-190° C.}/SFD_{23° C.}$, falls within a range of 0.90 to 1.50.

6. The magnetic recording medium according to claim 5, wherein the hexagonal ferrite powder has a saturation magnetization of greater than or equal to 30.0 $A·m^2/kg$.

7. The magnetic recording medium according to claim 5, wherein the hexagonal ferrite powder has a coercive force of greater than or equal to 159 kA/m.

8. The magnetic recording medium according to claim 5, wherein the average particle size of the hexagonal ferrite powder falls within a range of 10 nm to 35 nm.

9. The magnetic recording medium according to claim 5, wherein the $SFD_{23° C.}$ of the hexagonal ferrite powder is less than or equal to 0.60.

* * * * *